(12) United States Patent
Hartwell et al.

(10) Patent No.: US 8,196,639 B2
(45) Date of Patent: Jun. 12, 2012

(54) MODULAR PANEL ASSEMBLY

(75) Inventors: David Bell Hartwell, Minneapolis, MN (US); Jason David Pobul, Crystal, MN (US); Sharon Marie Johnson, Eden Prairie, MN (US)

(73) Assignee: Bellcomb Technologies Incorporated, Minneapolis, MN (US)

( * ) Notice: Subject to any disclaimer, the term of this patent is extended or adjusted under 35 U.S.C. 154(b) by 83 days.

(21) Appl. No.: 12/730,775

(22) Filed: Mar. 24, 2010

(65) Prior Publication Data
US 2011/0232850 A1 Sep. 29, 2011

(51) Int. Cl.
*A47G 5/00* (2006.01)
(52) U.S. Cl. ......... 160/135; 160/352; 160/230; 160/232
(58) Field of Classification Search ............... 160/135, 160/352, 230, 232; 52/482, 630, 631, 127.11, 52/127.7, 582.2, 581, 458; 403/292, 297, 403/350, 252
See application file for complete search history.

(56) References Cited

U.S. PATENT DOCUMENTS

| | | | | |
|---|---|---|---|---|
| 1,711,471 A | * | 4/1929 | Curran | .............................. 52/631 |
| 2,808,136 A | | 10/1957 | Hammitt et al. | |
| 3,029,051 A | * | 4/1962 | Nichols | .......................... 248/472 |
| 3,343,314 A | | 9/1967 | Smith | |
| 3,353,314 A | * | 11/1967 | Melcher | ........................ 52/127.9 |
| 3,785,103 A | * | 1/1974 | Turner | ........................ 52/309.11 |
| 3,826,056 A | | 7/1974 | Smith et al. | |
| 3,885,361 A | | 5/1975 | De Schutter | |
| 3,890,108 A | * | 6/1975 | Welsh | ............................ 428/593 |
| 3,999,342 A | | 12/1976 | Kaulfuss et al. | |
| 4,103,463 A | | 8/1978 | Dixon | |
| 4,185,430 A | | 1/1980 | Gartung | |
| 4,194,313 A | * | 3/1980 | Downing | ......................... 40/610 |
| 4,257,203 A | | 3/1981 | Propst et al. | |
| 4,360,286 A | | 11/1982 | Beer | |
| 4,531,564 A | * | 7/1985 | Hanna | ........................... 160/351 |
| 4,625,477 A | | 12/1986 | Johnstonbaugh | |
| 4,680,902 A | | 7/1987 | Stefnik et al. | |
| 4,799,819 A | | 1/1989 | Swoboda | |
| 4,821,787 A | | 4/1989 | Swanson | |
| 4,907,388 A | | 3/1990 | Siahatgar | |
| 4,968,171 A | | 11/1990 | Shell | |
| 5,115,855 A | * | 5/1992 | Lindblom et al. | ............ 160/135 |
| 5,131,448 A | * | 7/1992 | Miller | ........................... 160/135 |
| 5,187,908 A | | 2/1993 | Losensky | |
| 5,502,930 A | | 4/1996 | Burkette et al. | |
| 5,657,604 A | | 8/1997 | Malott | |
| 6,442,805 B2 | | 9/2002 | Pfister | |

* cited by examiner

*Primary Examiner* — Blair M. Johnson
(74) *Attorney, Agent, or Firm* — Fredrikson & Byron, PA

(57) ABSTRACT

A modular panel assembly that allows for rapid and relatively simple installation, while also providing flexibility for easy adaptation to any of a variety of constructions types. In some embodiments, the modular panel assembly involves panels which are prefabricated with panel connectors. Additionally, in some embodiments, the assembly involves two panel types that are substantially similar in their outward appearance, but differ internally so as to enable each of straight and non-straight surfaces for a structure being built.

18 Claims, 4 Drawing Sheets

MODULAR PANEL ASSEMBLY

BACKGROUND

1. Field of the Invention

The present invention relates to a multi-panel system for use in applications necessitating partitions and backdrops.

2. Description of the Related Prior Art

A typical problem associated with most known multi-panel systems is that when they are assembled at a building site, they are not sufficiently flexible to allow for easy adaptation to various architectural plans. Generally, panels are precut into dimensions such as 4'×8', 6'×10', etc. In addition, the panels are typically rigid in construction across their widths and lengths. Consequently, if architectural plans call for any deviation from the pre-existing dimensions or for structures having any sort of non-straight or curved surfaces, it is very difficult to adapt the panels to the building specification.

Another dilemma often faced in building structures (such as displays) with prefabricated panels is the mechanism by which the panel members are held together as a frame. In a typical panel display, each structural panel member has a generally rectangular central channel extending lengthwise there through and a pair of longitudinally-extending channels, each on an opposing side of the central channel. In turn, these longitudinally-extending channels are generally configured to mate with panel connectors, or vice versa, so as to join adjacently-positioned panels together. However, problems can often be experienced with the connectors. For example, in some cases, the connectors are configured with a variety of different components, thereby making them complex and time-consuming to use as well as expensive to purchase. In addition, with the manner in which the components of the connectors are configured together, such connectors can often be prone to falling apart if not handled properly. Finally, such connectors, if separately provided from the panels, require multiple steps for joining them to a first panel and then securing a second panel thereto.

The present invention solves these and other problems.

SUMMARY OF THE INVENTION

Embodiments of the invention provide a modular panel assembly that allows for rapid and relatively simple installation, while also providing flexibility for easy adaptation to any of a variety of constructions types. In certain embodiments, the modular panel assembly involves panels which are prefabricated with panel connectors. Additionally, in certain embodiments, the assembly involves two panel types that are substantially similar in their outward appearance, but differ internally so as to enable each of straight and non-straight surfaces for a structure being built.

In one embodiment, a modular panel system is provided which can be used to meet varying structural requirements for different construction applications. The system comprises a plurality of prefabricated panels. The panels comprise two panel types. A first panel type is for constructing straight construction surfaces and has a generally rectangular central channel defined between front and rear sheets thereof and has a pair of frame members on opposing vertical ends thereof. The central channel of the first panel type is packed with filler material. A second panel type is for constructing non-straight construction surfaces and has a generally flexible rectangular central channel defined between front and rear sheets thereof and has a pair of frame members on opposing vertical ends thereof. The central channel of the second panel type lacks filler material. The system further comprises a plurality of connection means integrally formed with the frame members of each of the panels of the first panel type and the second panel type. Each connection means is partially concealed within the frame members of unjoined panels of the first panel type and the second panel type and completely concealed by the frame members when used in joining any panels of either the first panel type or the second panel type. Each connection means is manipulated for joining or unjoining the panels of the first panel type and the second panel type via rotation of a fastener stemming from the connection means. Each fastener protrudes from one of the front or rear sheets of the panels of the first panel type and the second panel type.

In another embodiment, a modular panel system is provided which can be used to meet varying structural requirements for different construction applications. The system comprises a plurality of prefabricated panels. The panels each have a generally rectangular central channel defined between front and rear sheets thereof and each have a pair of frame members on opposing vertical ends thereof. The central channel defines a space there between the front and rear sheets. The system further comprises a plurality of panel connectors integrally formed with the frame members of each of the panels. Each panel connector is partially concealed within the frame members of unjoined panels and completely concealed by the frame members when used in joining the panels. Each panel connector is manipulated for joining or unjoining the panels via rotation of a fastener stemming from the panel connector. Each fastener protrudes from one of the front or rear sheets of the panels. Each panel connector comprises a first locking bar that is rotatably linked with a second locking bar. The first locking bar having a proximal end that forms a seat within which a proximal end of the second locking bar fits and aligns.

DETAILED DESCRIPTION

Figure 1A:
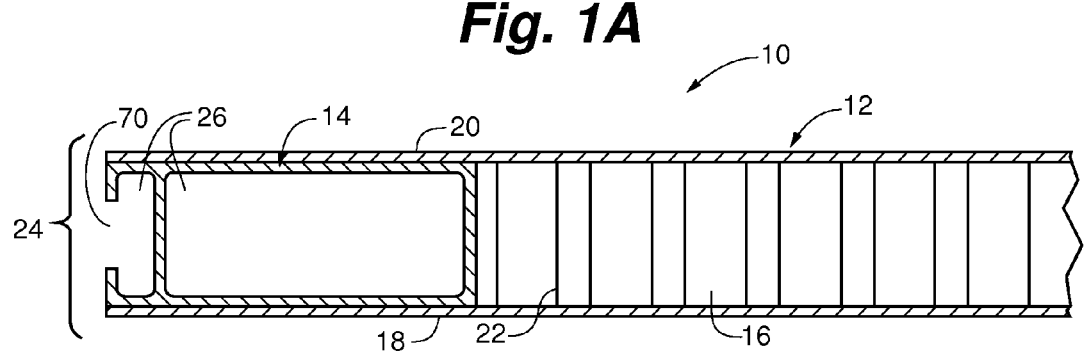
FIG. 1A is a cross-sectional elevation view of an end portion of a panel of a first panel type in accordance with certain embodiments of the invention.

The following detailed description should be read with reference to the drawings, in which like elements in different drawings are numbered identically. The drawings depict selected embodiments and are not intended to limit the scope of the invention. It will be understood that embodiments shown in the drawings and described below are merely for illustrative purposes, and are not intended to limit the scope of the invention as defined in the claims.

In use, the modular panel assembly of the present invention can be used in any of a variety of different applications. For example, such assembly may be used as a cordon or barrier for an area, e.g., to prevent access and/or block the view of persons in the surrounding area. Conversely, such assembly may be used for attracting attention, thereby enticing people to view and/or approach an area. For example, in the case of a store front, particularly in a mall, the modular panel assembly can be used in forming a display space behind the store's front window. In such enclosed space, the retailer would be able to display advertisements and/or new or select products on sale. Alternatively, the modular assembly can be constructed beyond the front window(s) to aesthetically enhance the store's entryway. As such, the panels could be painted or decorated so as to attract attention to the store and generate increased business. As alluded to above, it should be understood that description of these few applications are not meant to limit the uses of the embodied modular panel assembly, but conversely to provide a sense of these and other potential applications that the present invention avails itself to.

In general, the modular panel assembly of the present invention involves a plurality of wall panels which utilize a simplified, yet highly effective panel interconnection means, the structure and function of which will be described herein in greater detail. Additionally, in certain embodiments, the wall panels, while substantially similar with respect to their outer appearance and construction, have variation with respect to their internal composition. Consequently, when building desired structures, the panels can be interconnected in a like and relatively uncomplicated manner, while also enabling the panels to be easily adaptable to a variety of construction shapes.

FIG. 1A is a cross-sectional elevation view of an end portion of a panel of a first panel type used in accordance with certain embodiments of the invention. As shown, the end portion of the panel 10 includes a main body 12 and a frame member 14. The main body 12 has a generally rectangular central channel 16 defined between front and rear sheets 18 and 20, respectively, of the panel 10. As shown, the central channel 16 of the panel 10 is packed with filler material 22. In certain embodiments, the front and rear sheets 18, 20 are formed of a relatively flexible material, yet the filler material 22 there between is used to indirectly enhance the rigidity of the sheets 18, 20. In certain embodiments, the filler material 22 is of a honeycomb structure which defines a plurality of openings roughly a half inch in diameter or so extending perpendicularly of the sheets 18, 20; however, it should be appreciated that the make-up of the filler material 22 can be varied as desired. In certain embodiments, the honeycomb structure can be formed of one or more materials such as cardboard, aluminum, foam, plastic, or the like so as to limit the overall weight of the panel 10.

Figure 1B:
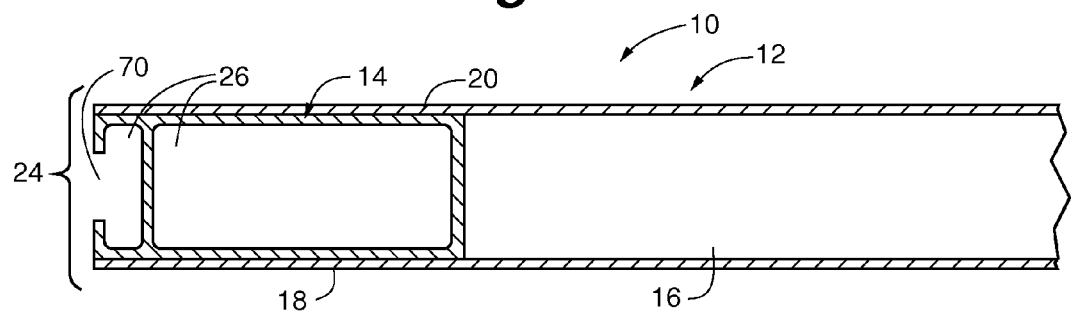
FIG. 1B is a cross-sectional elevation view of an end portion of a panel of a second panel type in accordance with certain embodiments of the invention.

By way of comparison, FIG. 1B is a cross-sectional elevation view of an end portion of a panel of a second panel type used in accordance with certain embodiments of the invention. While similar in other respects to the panel 10 of FIG. 1A, the panel 10' of FIG. 1B has entirely no filler material in its central channel 16. Benefits of such panel 10' lacking filler material will be described herein later. However, at this point, in describing the further characteristics of the panel 10 of FIG. 1A below, it is to be understood that its characteristics hold true for the panel 10' of FIG. 1B (such that the two are interchangeable), unless described otherwise.

With further reference to the panel 10 of FIG. 1A, the outer planar surface sides of the sheets 18, represent the exposed surfaces of a structure built with a plurality of the panels 10. As such, it may be desirable for the outer surfaces of one or more of the sheets 18, 20 to be made aesthetically pleasing. Accordingly, in certain embodiments, the outer surfaces of one or more of the sheets 18, 20 can be pre-configured with fastening mechanisms, enabling the sheet(s) to be covered with a layer of fabric or other decorative material. However, in other certain embodiments, the outer surfaces of one or more of the front and rear sheets 18, 20 can be preformed with decorative material, such as fabric, or other materials, such as ABS (Acrylonitrile-Butadiene-Styrene), vinyl, or aluminum, thereon or as an integral part thereof.

Figure 4:
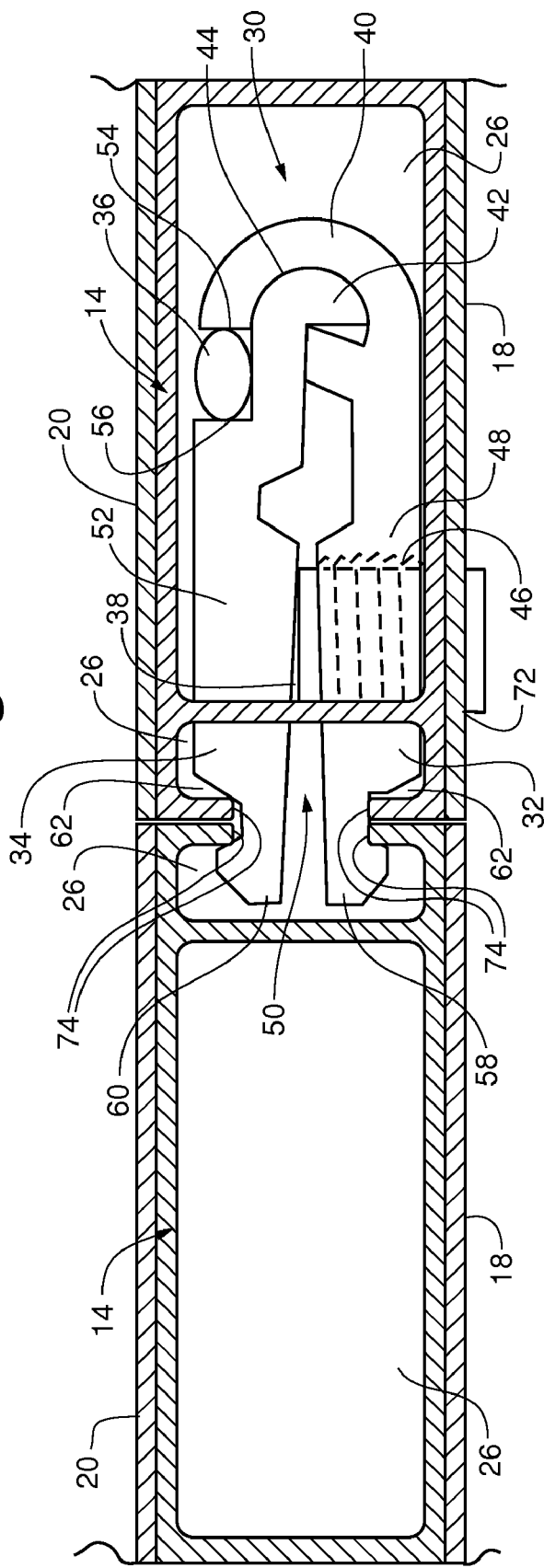
FIG. 4 is a cross-sectional elevation view of two frame members as shown in FIG. 2 joined via the panel connector of FIG. 2 in accordance with certain embodiments of the invention.

As described above, the end portion of the panel 10 includes a frame member 14. Such frame member 14 is included on the vertical end 24 of the panel 10. As shown, the sheets 18, 20 of the panel 10 overlay opposing planar sides of the frame member 14. In certain embodiments, the sheets 18, 20 of the panel 10 completely overlay opposing planar sides of the frame member 14. One benefit of such a configuration is to encase and conceal the frame member 14 from view when the panel 10 is adjoined to a further panel, as is depicted in FIG. 4. While not shown in FIGS. 1A and 1B, a further frame member 14 is included in like fashion on the opposing vertical end of the panels 10 and 10'. Accordingly, each of the panels 10, 10' has a pair of the frame members 14, with one on each opposing vertical end of the panel's central channel 16.

Figure 2:
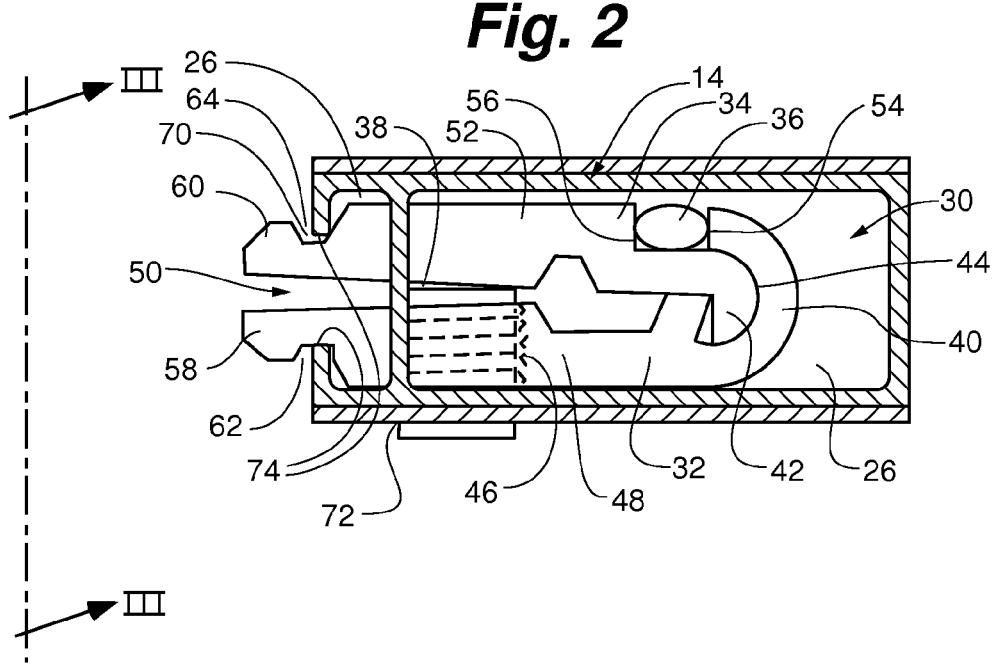
FIG. 2 is a cross-sectional elevation view of a frame member, as shown with the panels of FIGS. 1A and 1B, with a panel connector integrally provided therewith in accordance with certain embodiments of the invention.

In certain embodiments, the frame member 14 is a longitudinally extending slotted channel. The frame member 14, as its name implies, provides side structural support for the panel 10 as well as providing a conduit for connectional means between it and a further panel 10 or 10'. In certain embodiments, as shown, the channel of the frame member 14 has a generally rectangular cross section with a plurality of slots 70 defined therein, as exemplified in FIG. 3. Such slots 70 are formed in the channel so as to provide for the connection means between adjoined panels 10 (or panels 10' or one each of panel 10 and panel 10'). In certain embodiments, with reference to FIGS. 1A, 1B, and 2, each of the slots 70 opens internally to a cavity 26 within the channel of the frame member 14, with such cavity 26 sized to house a panel connector. To that end, FIG. 2 is a cross-sectional elevation view of the frame member 14 with a panel connector 30 integrally provided therein in accordance with certain embodiments of the invention. The cross-sectional view of FIG. 2 shows a cross section of one of the cavities 26 of the frame member 14 and the panel connector 30 therein.

The panel connector 30, as alluded to above, is configured to be rather simple in its construction, which enables its ease of use in adjoining together two panels 10 (or two panels 10' or one each of panel 10 and panel 10'). As shown, in certain embodiments, the panel connector 30 is formed of four components involving first and second locking bars 32 and 34, a resilient member 36 for limiting the amount of angular separation between the locking bars 32 and 34, and a fastener 38. In certain embodiments, the locking bars 32 and 34 each have proximal portions 40 and 42, respectively, which allow for the bars 32, 34 to be rotatably linked. To that end, in certain embodiments, as shown, the proximal portion 40 of the locking bar 32 forms a seat 44 within which the proximal portion 42 of the locking bar 34 fits and aligns. As shown in FIG. 2, the proximal portion 42 of the second locking bar 34 is curved and the seat 44 of the first locking bar 32 is curved so as to align with the curve of the second locking bar 34, wherein the curves of the first and second locking bars 32 and 34 align in contacting fashion during rotation of the first locking bar 32 with respect to the second locking bar 34. Consequently, such seat 44 enables the locking bar proximal portions 40, 42 to be conjoined securely with each other, while permitting rotation there between. Such rotation, as further detailed below, enables angular movement of distal portions 48, 52 of the locking bars 32, 34 relative to each other.

The fastener 38 of the panel connector 30 functions to facilitate the angular manipulation between the locking bars 32, 34. As shown, in certain embodiments, a portion of the fastener 38 is adjustably retained within a threaded bore 46 defined in the distal portion 48 of the locking bar 32. Such bore 46 opens to a space 50 defined between the locking bars 32, 34. When employed, the fastener 38 is threaded in the bore 46 of the locking bar 32 so as to extend across the space 50 and to contact the distal portion 52 of the locking bar 34. Accordingly, when the fastener 38 is rotated in the bore 46 so as to be further advanced in a direction toward the space 50, the locking bar distal portions 48 and 52 in effect are forced apart, with such distal portion 48 of bar 32 being angularly moved away from the opposing distal portion 52 of bar 34. Conversely, when the fastener 38 is rotated in the bore 46 so as to be withdrawn in a direction away from the space 50, the locking bar distal portions 48 and 52 in effect are drawn together, with such distal portion 48 of bar 32 being angularly moved toward the opposing distal portion 52 of bar 34. The fastener 38 can be any of known varieties; however, in certain embodiments, it is of an Allen type (so as to be manipulated with an Allen wrench) in order to prevent stripping of such from repeated use.

As described above, a resilient member 36 is used with the locking bars 32, 34 for limiting the amount of angular separation therebetween. As depicted in FIG. 2, the fastener 38, by its linkage with the distal portion 48 of bar 32 and its contact with the distal portion 52 of bar 34, keeps such distal portions 48, 52 from being brought further together, i.e., further narrowing the space 50 there between, without corresponding manipulation of the fastener 38. To provide additional stability for the panel connector 30, the resilient member 36 is used to prevent the locking bar distal portions 48, 52 from being free to further separate from each other, i.e., with the space 50 widening there between. In certain embodiments, as shown, the resilient member 36 is retained between adjacent outer edges 54 and 56 of the locking bars 32 and 34, respectively. In turn, regardless of manipulation of the fastener 38, the resilient member 36 serves to resiliently exert pressure upon such adjacent outer edges 54, 56 of the locking bars 32, 34. Consequently, the space 50 between the bar distal portions 48, 52 is kept from widening without further manipulation of the fastener 38. The resilient member 36 can be formed of any such resilient material, such as rubber, plastic, or like materials. Additionally, the resilient member 36 can be formed of any shape so long as it can be wedged between the outer edges 54, 56 of the locking bars 32, 34.

Figure 3:
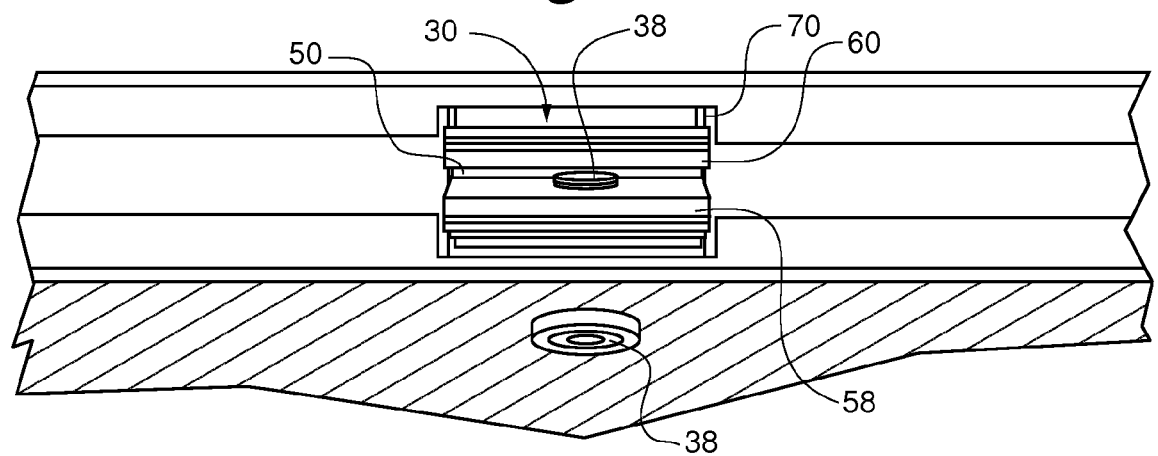
FIG. 3 is a side perspective view of the frame member of FIG. 2 along the lines of III-III.

As described above with respect to the frame member 14, each of its slots 70 opens internally to a cavity 26 within the frame member's channel, with such cavity 26 configured to house the panel connector 30, as depicted in FIG. 2. As further shown, such slot 70 is sized to allow distal ends 58 and 60 of the locking bars 32 and 34, respectively, to extend there through. Such is also illustrated by FIG. 3, which illustrates a side perspective view of the frame member 14 in accordance with certain embodiments of the invention. As shown by FIGS. 2 and 3, the panel connectors 30 are integrally formed in the panels 10, 10'. Consequently, extending from the frame member cavities 26 and further through the panels 10, 10' are openings 72 which align with the fasteners 38 jutting out from the panel connectors 30.

FIG. 4 shows a cross-sectional elevation view of the frame members 20 of two panels joined via one of the panel connectors 30 in accordance with certain embodiments of the invention. It should be appreciated that the joined panels 10 of FIG. 4 can involve two panels 10, two panels 10', or one each of panel 10 and panel 10'. Defined within the locking bar distal ends 58 and 60 of the panel connector 30 are indentations 62 and 64, respectively, which are sized to mate with slot edges 74 of the panel frame member 14 housing the connector 30. These same indentations 62 and 64 further serve to hold corresponding slot edges 74 of a frame member 14 of a further panel 10 or 10' for connection purposes.

In certain embodiments, the frame members 14 of the panels 10, 10' have slots 70 that are similarly positioned and spaced along their lengths. Accordingly, the panels 10, 10', regardless of their distinct internal compositions, can be routinely secured together by bringing vertical ends of each of the panels 10, 10' together so as to bring close the corresponding slots 70 of each, and then tightening the corresponding fasteners 38 (jutting out the sides of the panels 10, 10') to adjoin the slot edges 74 of each of the panels 10, 10', thereby adjoining those portions of the panels 10, 10'.

In light of the above description, the rest of the present invention can be detailed. As described above, the modular panel system involves a plurality of wall panels which utilize a simplified, yet highly effective panel interconnection means. This simplicity and effectiveness can be gleaned from that already described. For example, the embodied panel connectors 30 have limited parts, thereby limiting their complexity and enhancing the ease of their use. In addition, the connectors 30 are integrally provided in the frame members 14 of the panels 10, 10'. Accordingly, the panels 10, 10' can be adjoined through a limited number of steps for the installer, i.e., bringing close the corresponding slots 70 of each to-be-joined panel 10 and/or 10', and then tightening the corresponding fasteners 38 of the panel connectors 30. Further, in certain embodiments, only one vertical side of the panels 10, 10' needs to be configured with the panel connectors 30 to join two panels 10 and/or 10' together.

Figure 5:
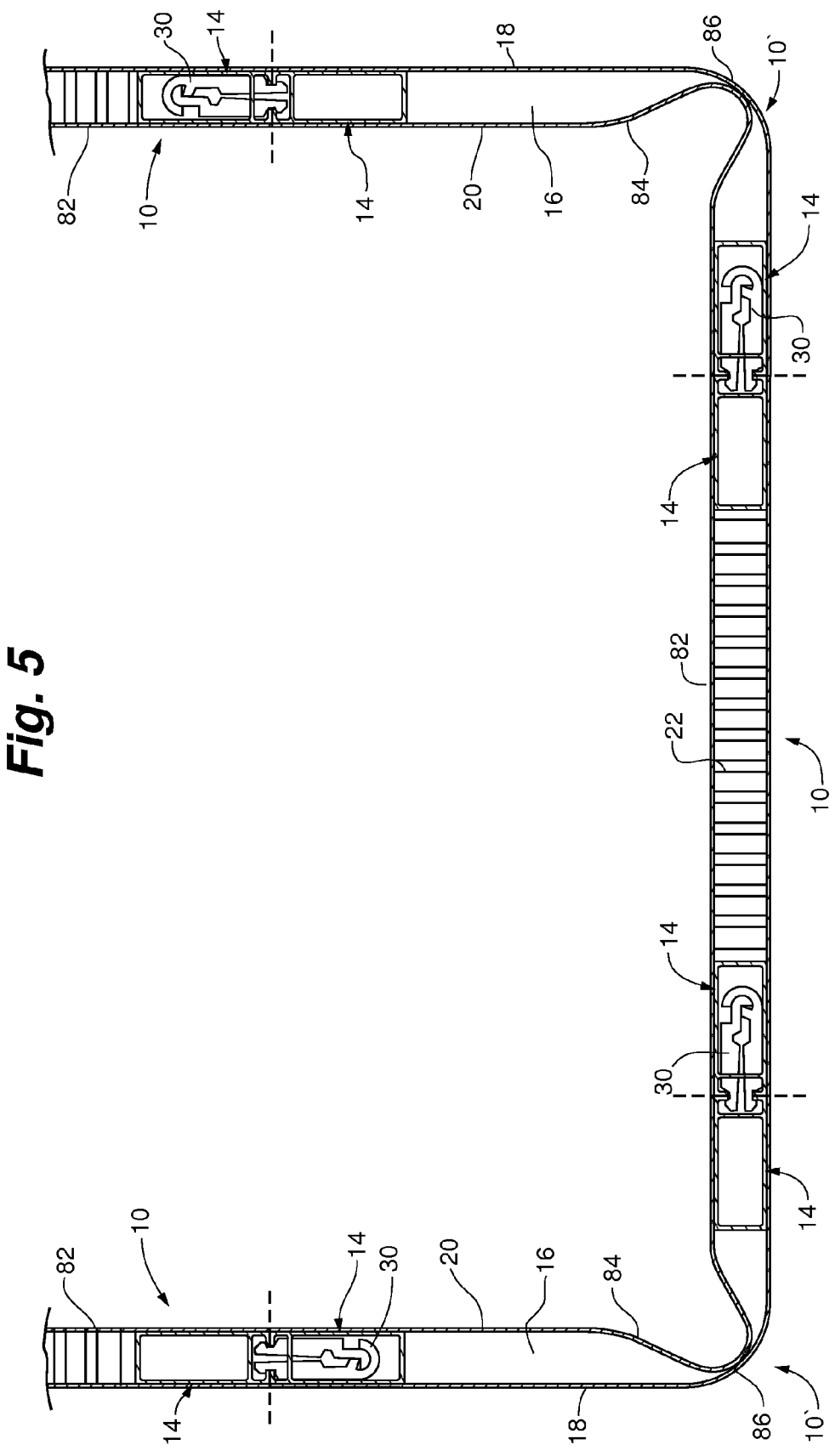
FIG. 5 is a cross-sectional elevation view of a portion of a multi-panel structure utilizing the first and second panel types of FIGS. 1A and 1B, respectively, in certain embodiments of the invention.

As alluded to above, using two types of panels 10 and 10' with the same outward appearance and connection system (as described above) allows the panels 10, 10' to be interconnected in a like and relatively uncomplicated manner, while also enabling the panels 10, 10' to be easily adaptable to a variety of construction shapes. For example, if needing a straight surface for the construction, the panel 10 of FIG. 1A can be used; however, if any non-straight (e.g., curved and/or bent) surface is needed, the panel 10' of FIG. 1B can be used. Such panel 10', because it lacks filler material in its central channel 16, can be freely shaped so as to provide such non-straight surfaces. FIG. 5 is a cross-sectional elevation view of a portion of a multi-panel structure 80 utilizing the panels 10 and 10' (with the separate panels 10, 10' distinguished via dashed lines shown there between). The panels 10 (with filler material 22) are used in forming straight wall sections 82 for the structure 80; conversely, the panels 10' are used in forming non-straight wall sections 84 (i.e., in this embodiment, the wall sections 84 define curved corners) for the structure 80. In certain embodiments, such non-straight wall sections 84 include one or more curved portions and/or one or more bent portions. As shown, because the panels 10' lack filler material, the panels 10' can be shaped so as to curve along the outer planar surface sides of its sheets 18, 20. As such, when forming an outer curve along a planar side of one of the panel sheets 18, 20, a segment of the other sheet opposing the curve freely collapses into the panel central channel 16 to allow for formation of the curve, e.g., such as forming a curved corner 86, for the panel 10'.

There are a variety of techniques that can be utilized when building multi-paneled structures using the panels 10, 10'. For example, one can initially install a panel 10 (with filler material 22) using any of wall, floor, or ceiling brackets. While such brackets are not shown in the figures, these types of brackets, and the procedures generally followed when used with panels, are well known in the art. In general, such brackets are initially mounted as intended (to a wall, the floor, or the ceiling), and then the panel is joined thereto. In some cases, the joining of the panels to the brackets can involve fasteners and/or sliding connections. In certain embodiments, the panels 10, 10' are configured to be joined to such brackets on their opposing upper and lower (or horizontal) ends.

Upon installing the panel 10 to one or more of a wall, the floor, or the ceiling (via brackets), the panel 10 forms a rigid structure for a next panel (either panel 10 or panel 10') to be joined thereto. As such, the next panel 10 or 10' would be joined to the installed panel 10 using the connectors 30 (protruding from either the installed panel 10 or the next panel 10 or 10') as described above. In cases where the next panel involves a panel 10', after joining such panel 10' to the installed panel 10, the segment of the panel 10' extending away from the junction can be bent and/or curved over its length as desired. Subsequently, the distal or opposing end of such panel 10' is secured to a further panel 10 (or 10') so as to maintain the bend and/or curve formed in the panel 10'. Such panel-to-panel construction is thereafter repeated until the installer reaches the last panel 10 or 10' to be installed, upon which the extending end of such panel would be mounted to the wall, floor, or ceiling (via brackets).

An alternative installation may involve initially installing a panel 10' of the multi-panel structure following steps similar to those described above. In turn, upon securing one of the ends of the panel 10' to wall, floor, and/or ceiling brackets, the segment of the panel 10' extending away from the junction can be bent and/or curved over its length as desired. Subsequently, the distal or opposing end of such panel 10' is secured to a further panel 10 (or 10') so as to maintain the bend and/or curve formed in the panel 10'.

It should be appreciated that while FIG. 5 depicts only a single curve being formed with each of the panels 10' shown, the invention should not be so limited. Instead, the panel 10' can be used to form a plurality of distinct curves over its length and/or one or more sharp bends or corners over its length in adhering to the design of a multi-panel structure. Further, while FIG. 5 shows each of the panels 10' having a curvature, the panels 10' can just as well be utilized in multi-panel structures having only straight sides.

It will be appreciated the embodiments of the present invention can take many forms. The true essence and spirit of these embodiments of the invention are defined in the appended claims, and it is not intended the embodiment of the invention presented herein should limit the scope thereof.

What is claimed is:

1. A modular panel system which can be used to meet varying structural requirements for different construction applications, comprising:

(a) a plurality of prefabricated panels, the panels comprising two panel types, a first panel type for constructing straight construction surfaces and having a generally rectangular central channel defined between front and rear sheets thereof and having a pair of frame members on opposing vertical ends thereof, the central channel of the first panel type packed with filler material, a second panel type for constructing non-straight construction surfaces and having a generally flexible rectangular central channel defined between front and rear sheets thereof and having a pair of frame members on opposing vertical ends thereof, the central channel of the second panel type entirely lacking filler material; and (b) a plurality of connection means integrally formed with the frame members on one of the vertical ends of the first panel type and the second panel type, each connection means being partially concealed within the frame members of unjoined panels of the first panel type and the second panel type and completely concealed by the frame members when used in joining any panels of either the first panel type or the second panel type, each connection means manipulated for joining or unjoining the frame members of abutting panels via rotation of a fastener stemming from the connection means, each fastener protruding from one of the front or rear sheets of the panels of the first panel type and the second panel type.

2. The modular panel system of claim 1 wherein each of the non-straight construction surfaces comprise one or more curved portions.

3. The modular panel system of claim 1 wherein the panels of the first panel type and the second panel type have substantially similar outward appearances.

4. The modular panel system of claim 1 wherein the filler material of the panels of the first panel type comprise a honeycomb structure.

5. The modular panel system of claim 4 wherein the front and rear sheets of the panels of the first panel type and the second panel type are formed of a relatively flexible material, wherein the front and rear sheets of the panels of the first panel type have an enhanced rigidity from the honeycomb structure there between.

6. The modular panel system of claim 1 wherein the front and rear sheets of each of the panels of the first panel type and the second panel type completely overlay opposing planar sides of the corresponding frame members.

7. The modular panel system of claim 1 wherein each frame member of the panels of the first panel type and the second panel type comprises a longitudinally extending slotted channel, wherein each slot opens internally to a cavity within the channel of the frame member.

8. The modular panel system of claim 7 wherein each cavity is sized to house one of the plurality of connection means.

9. The modular panel system of claim 1 wherein each connection means comprises an assembly of four components consisting of a first locking bar and a second locking bar wherein the first locking bar is rotatably linked with the second locking bar, a resilient member directly coupled between outer edges of the first locking bar and the second locking bar, and the fastener extending through a bore of one of the first locking bar and the second locking bar so as to extend there between the first locking bar and the second locking bar and to make contact with the other of the first locking bar and the second locking bar.

10. The modular panel system of claim 9 wherein the resilient member is wedged between the outer edges of the first locking bar and the second locking bar so as to limit rotation of the first locking bar with respect to the second locking bar relative to widening space there between.

11. The modular panel system of claim 9 wherein the fastener extends through a bore of the first locking bar and further extends between the first locking bar and the second locking bar and makes contact with the second locking bar, wherein the fastener limits rotation of the first locking bar with respect to the second locking bar relative to narrowing space there between.

12. The modular panel system of claim 1, wherein each connection means is a panel connector, each panel connector comprising a first locking bar that is rotatably linked with a second locking bar.

13. The modular panel system of claim 12 wherein the first locking bar has a proximal end that forms a seat within which a proximal end of the second locking bar fits and aligns, the proximal end of the second locking bar having a curve and the seat of the first locking bar having a curve so as to align with the curve of the second locking bar, wherein the curves of the proximal ends of the first and second locking bars align in contacting fashion during rotation of the first locking bar with respect to the second locking bar.

14. The modular panel system of claim 12 wherein each panel connector comprises an assembly of four components consisting of the first locking bar and the second locking bar, a resilient member directly coupled between outer edges of the first locking bar and the second locking bar, and the fastener extending through a bore of one of the first locking bar and the second locking bar so as to extend there between the first locking bar and the second locking bar and to make contact with the other of the first locking bar and the second locking bar.

15. The modular panel system of claim 14 wherein the resilient member is wedged between the outer edges of the first locking bar and the second locking bar so as to limit rotation of the first locking bar with respect to the second locking bar relative to widening space there between.

16. The modular panel system of claim 14 wherein the fastener extends through a bore of the first locking bar and further extends between the first locking bar and the second locking bar and makes contact with the second locking bar, wherein the fastener limits rotation of the first locking bar with respect to the second locking bar relative to narrowing space there between.

17. The modular panel system of claim 1 wherein the central channel of the second panel type lacking filler material enables the second panel type to be bent to form a non-straight surface and subsequently straightened to form a straight surface across the front and rear sheets of the second panel type.

18. The modular panel system of claim 12 wherein each of the first locking bar and the second locking bar has a distal end with an indentation, the indentation of each locking bar sized to accommodate corresponding side edges of the frame members of the abutting panels so as to join the side edges of the frame members when the fastener is rotated so as to spread the first and second locking bars apart.

* * * * *